April 21, 1925.
J. P. COUGHLIN
1,534,055
RADIOCHART
Filed April 13, 1923      2 Sheets-Sheet 2
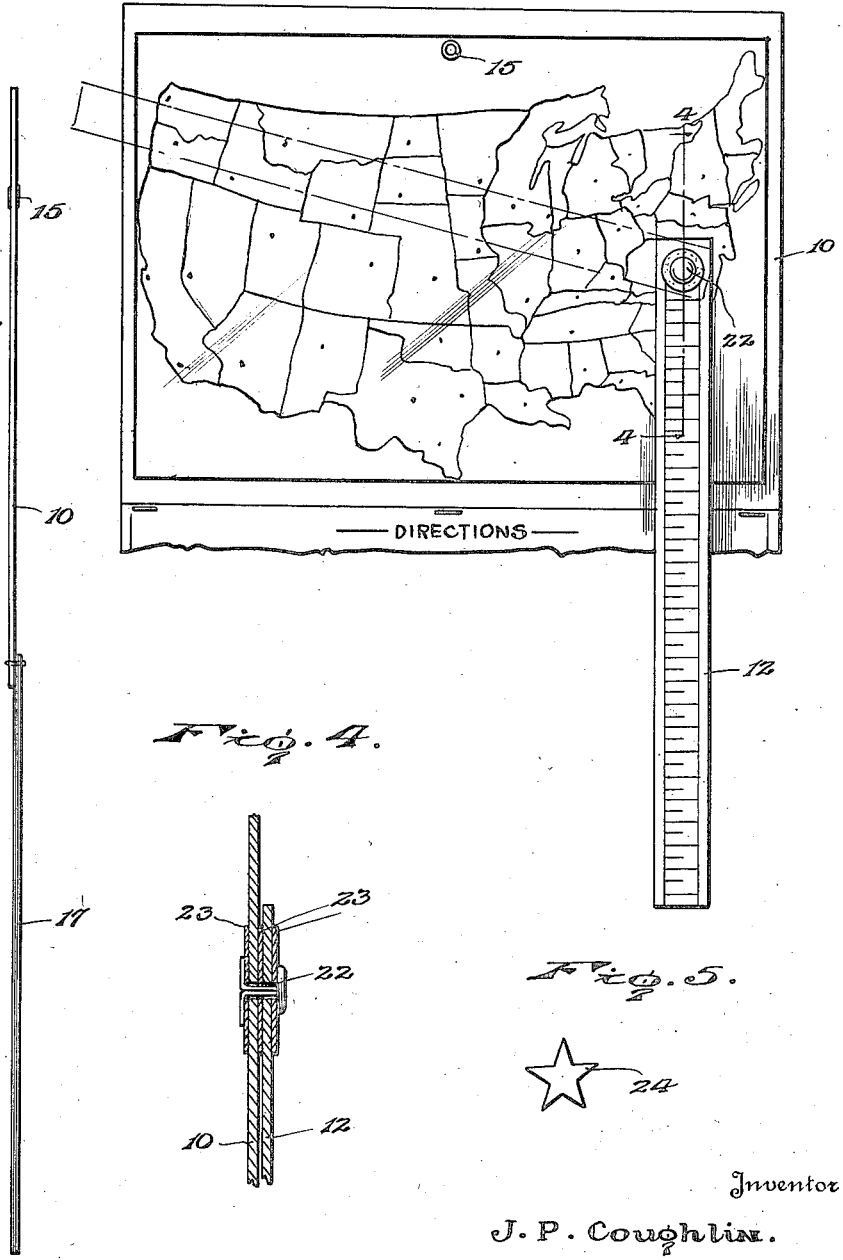

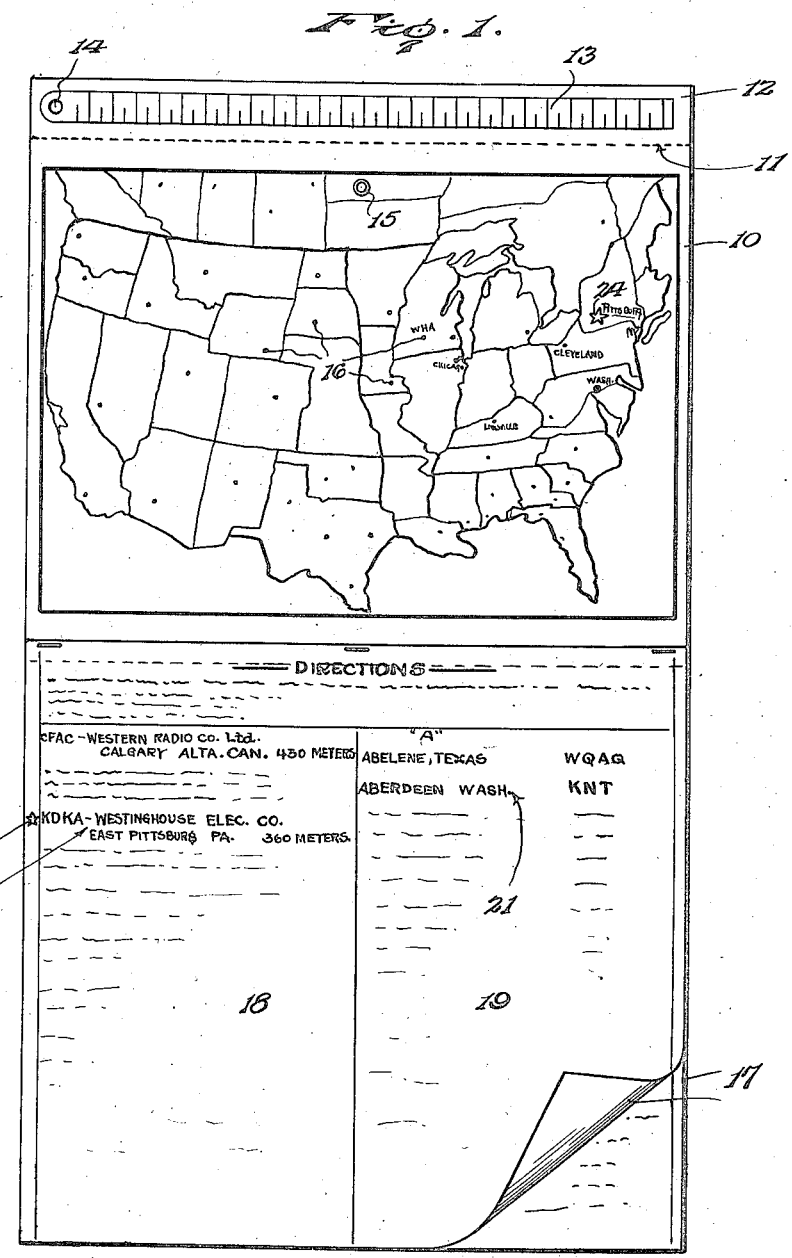

Patented Apr. 21, 1925.

1,534,055

UNITED STATES PATENT OFFICE.

JAMES P. COUGHLIN, OF KANSAS CITY, MISSOURI.

RADIOCHART.

Application filed April 13, 1923. Serial No. 631,828.

*To all whom it may concern:*

Be it known that I, JAMES P. COUGHLIN, citizen of the United States, residing at Kansas City, in the county of Jackson and State of Missouri, have invented certain new and useful Improvements in Radiocharts, of which the following is a specification.

This invention relates to an improved radio chart and seeks, as one of its principal objects, to provide a chart embodying a map and wherein means will be supplied in conjunction with the map whereby a listener at a receiving station may readily determine the distance from such station of a broadcasting station heard.

The invention seeks, as a further object, to provide a chart embodying an integrally attached measure which may be cut from the chart for separate use and pivoted upon the map at the location of the receiving station of the listener whereby when a broadcating station is heard, the measure may be swung to extend between the point of location on the map of the broadcasting station and the point of location of the listening station for measuring the distance between the stations.

A further object of the invention is to provide a chart embodying reference sheets alphabetically listing the call letters of the different broadcasting stations and giving the cities in which the stations are located, so that when the call letters of any station are heard, the location of such station may be readily determined by referring to the reference sheets.

Another object of the invention is to provide a chart embodying reference sheets alphabetically listing the names of cities in which broadcasting stations are located so that should a listener fail to hear the call letters of a station but should hear the name of the city from which the station is sending, the name of the station may be readily determined by referring to the reference sheets.

And the invention seeks, as a still further object, to provide a chart wherein means will be supplied whereby a record may be easily made of broadcasting stations heard.

Other and incidental objects will appear hereinafter.

In the drawings:

Figure 1 is a front elevation of my improved chart,

Figure 2 is an edge elevation of the device,

Figure 3 is a fragmentary front elevation showing the measure pivoted upon the map card of the chart, Figure 4 is a detail sectional view on the line 4—4 of Figure 3, looking in the direction of the arrows, and illustrating the pivotal mounting of the measure, and Figure 5 is a detail view showing a typical record sticker employed.

In carrying the invention into effect, I employ a map card 10 of appropriate dimensions. This card may be of cardboard or other suitable material and printed or otherwise imposed upon the front face of the card is a map of the United States or other country in which the device is to be distributed. In the present instance, I have shown the map as also including a portion of Canada. Extending across the card near its upper edge is a score line 11 defining a measure strip 12 at the upper margin of the card. This measure strip is suitably calibrated, as indicated at 13, in conformity with the scale of the map, and formed in the strip near one end thereof is an opening 14. Preferably, the card 10 is provided near the upper edge of the map with a centrally disposed eyelet 15 so that the chart may be readily hung upon a wall or the like. Suitably indicated upon the map, as at 16, are the points of location of cities in which radio broadcasting stations are situated and, preferably, the names of the cities are, as indicated, also given upon the map. Only the cities having broadcasting stations are indicated, the map being, except for boundaries, otherwise free of any other lines or data. This is done in order that the user of the chart may easily find the broadcasting station cities.

Stapled or otherwise secured to the lower margin of the map card 10 is a plurality of reference sheets 17, each ruled off vertically into columns as indicated at 18 and 19, while at the head of the first of said sheets are printed suitable directions for using the chart. Printed upon one or more of the sheets, as may be required, is an alphabetically arranged list of the call letters of the different broadcasting stations located in the territory given by the map upon the card 10. While an entire list of all of the call letters of the several broadcasting stations located in the United States and Canada, for instance, will probably require several of the reference sheets, I have, for convenience, illustrated in the column 18 of the first sheet, as depicted at 20, the manner in which the call letters are preferably listed and, as will be observed, the name of the broadcasting station, the city and State in which it is located, and the transmitting wave length of the station, is given in conjunction with each call. Thus, should a listener hear the call letters of a particular station, the location of the station may be readily determined by consulting the reference sheets. Likewise, the reference sheets, as indicated at 21 in the column 19 of the first sheet, also carry an alphabetically arranged list of the cities in which the broadcasting stations are located, the State in which each city is located being given opposite thereto, and the call letters of all of the broadcasting stations in each city being listed in connection therewith. Accordingly, should a listener fail to hear the call letters of a particular broadcasting station but should hear the name of the city in which the station is located, the call letters of the station may be readily ascertained by consulting the reference sheets. This would, of course, strictly apply to cities having but a single broadcasting station. In cities having several broadcasting stations, the reference sheets would, of course, serve to segregate the station being heard as among a limited number of calls listed under the particular city.

In use, the strip 12 is cut from the card 10 along the line 11 so that the measure strip may be used separately, when the strip is, as illustrated in Figure 3, pivoted upon the map card 10 at the point of location of the receiving station of the listener or at the point of location of the nearest city having a broadcasting station. For this purpose, a staple 22 is provided, the staple being inserted through the opening 14 in the measure strip and through the map card, when the prongs of the staple are bent laterally at the rear of the card. Washers 23 of fabric or other suitable material are also supplied and are arranged at each side of the measure strip as well as at the rear side of the map card, surrounding the staple for reducing possible wear upon the strip and chart. Thus, when the listener hears a broadcasting station, the measure strip may, as suggested in dotted lines in Figure 3, after the location of the station has been ascertained by consulting the reference sheets, be swung to extend between the point of location of the listening station and the point of location of the broadcasting station, as indicated upon the map, for determining the distance between the stations. As illustrated in Figure 5, red or other colored stickers 24 are provided and when a broadcasting station is thus heard, one of these stickers is placed over the point upon the map indicating the city in which the broadcasting station is located while another of the stickers is, as shown near the top of the column 18 of the first reference sheet 17, placed in the margin of the column of the sheet opposite the call letters of the station. A record may thus be conveniently made of all broadcasting stations heard while the efficiency of the listening station may, at any time, be demonstrated by measuring the distance between any broadcasting station and the listening station.

Having thus described the invention, what is claimed as new is:

As a new article of manufacture, a radio chart including an oblong card bearing the representation of a map at its upper portion and provided immediately beneath the map with sheets bearing indicia pertaining to the map, the upper margin of the card immediately above the map being apertured near one end at one corner of the card and calibrated transversely of the card to represent a ruler having its union with the map weakened by a transverse score line whereby the ruler may be readily severed from the map and pivotally mounted thereon by a fastening device extending through said aperture and map for use in determining distances on the map.

In testimony whereof I affix my signature.

JAMES P. COUGHLIN. [L. S.]